No. 845,654. PATENTED FEB. 26, 1907.
C. H. LAYNG.
SEPARABLE COUPLING.
APPLICATION FILED OCT. 24, 1906.

Witnesses:—
J. George Barry,
J. G. Hachenburg.

Inventor:—
Charles H. Layng
by attorneys
Brown & Seward

UNITED STATES PATENT OFFICE.

CHARLES H. LAYNG, OF NEW YORK, N. Y.

SEPARABLE COUPLING.

No. 845,654. Specification of Letters Patent. Patented Feb. 26, 1907.

Application filed October 24, 1906. Serial No. 340,339.

*To all whom it may concern:*

Be it known that I, CHARLES H. LAYNG, a citizen of the United States, and a resident of the borough of Manhattan, in the city and State of New York, have invented a new and useful Improvement in Separable Couplings, of which the following is a specification.

The object of my present invention is to provide certain improvements in the construction, form, and arrangement of the several parts of a separable coupling whereby the two members thereof may be readily connected and disconnected.

This separable coupling is more particularly intended for use in connection with necklaces, but may be equally well employed in all places where it is desired to connect two parts by a separable coupling.

Figure 1:
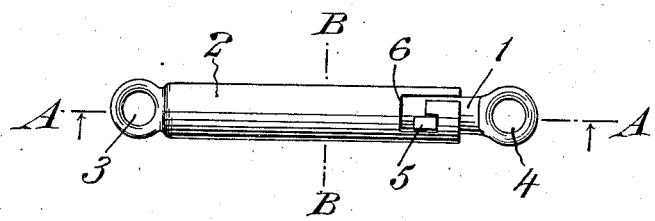
Figure 2:
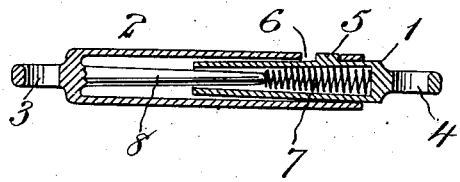
Figure 3:
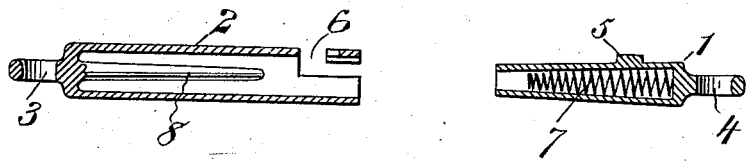
Figure 4:

In the accompanying drawings, Figure 1 represents in side elevation the coupling in its connected position. Fig. 2 is a longitudinal section taken in the plane of the line A A of Fig. 1 looking in the direction of the arrows. Fig. 3 is a similar section with the two members separated, and Fig. 4 is a transverse section taken in the plane of the line B B of Fig. 1.

The two members of the separable coupling are of closed-ended tubular construction and are denoted by 1 and 2, and each of the members is provided with means for the attachment of the parts to be connected and disconnected, the means in the present instance being shown as eyes 3 and 4 at the closed ends of the members.

The male member 1 of the coupling is provided on its periphery with a lug 5, and the female member 2 is provided with an L-shaped recess 6 in its inner end, arranged to have a bayonet-joint connection with the lug 5 of the male member.

The means which I have shown for yieldingly holding the two members in their connected position comprises a coil-spring 7, located in the bore of the male member 1, and a plunger 8, located centrally in the bore of the female member 2.

To prevent the spring 7 from escaping from within the bore of the male member 1, I preferably make the bore of tapered form, with its open end smaller than its closed end and make the spring of coils normally larger than its open end, so that when the spring is forced into the bore it will stay therein.

As the male member is inserted into the female member the plunger 8 in the female member will engage the spring 7 and compress it, so that when the lug 5 has been turned laterally in its recess 6 the tension of the spring will tend to hold the lug 5 in the end of the recess.

A separable coupling constructed and arranged as above described is very simple and inexpensive and may be made very small in diameter, and therefore neat in appearance, thus making the coupling particularly well adapted for use in connection with necklaces and the like.

What I claim is—

1. A separable coupling comprising tubular male and female members having a bayonet-joint connection, one of the members being provided with a spring within its bore and the other member with a plunger within its bore arranged to compress the spring when the members are in their connected position, for yieldingly locking the members together.

2. A separable coupling comprising tubular male and female members having a bayonet-joint connection, the male member being provided with a spring within its bore and the female member with a plunger within its bore arranged to compress the spring when the members are connected and for yieldingly locking the members together.

3. A separable coupling comprising tubular male and female members having a bayonet-joint connection, the male member having a tapered bore and provided with a spring held therein by the taper of the bore, and a female member having a centrally-arranged plunger within its bore arranged to compress the spring when the members are connected, for yieldingly locking the members together.

In testimony that I claim the foregoing as my invention I have signed my name, in presence of two witnesses, this 20th day of August, 1906.

CHARLES H. LAYNG.

Witnesses:
F. GEORGE BARRY,
HENRY THIEME.